May 5, 1970   V. HANEY   3,510,210
COMPUTER PROCESS CHARACTER ANIMATION
Filed Dec. 15, 1967
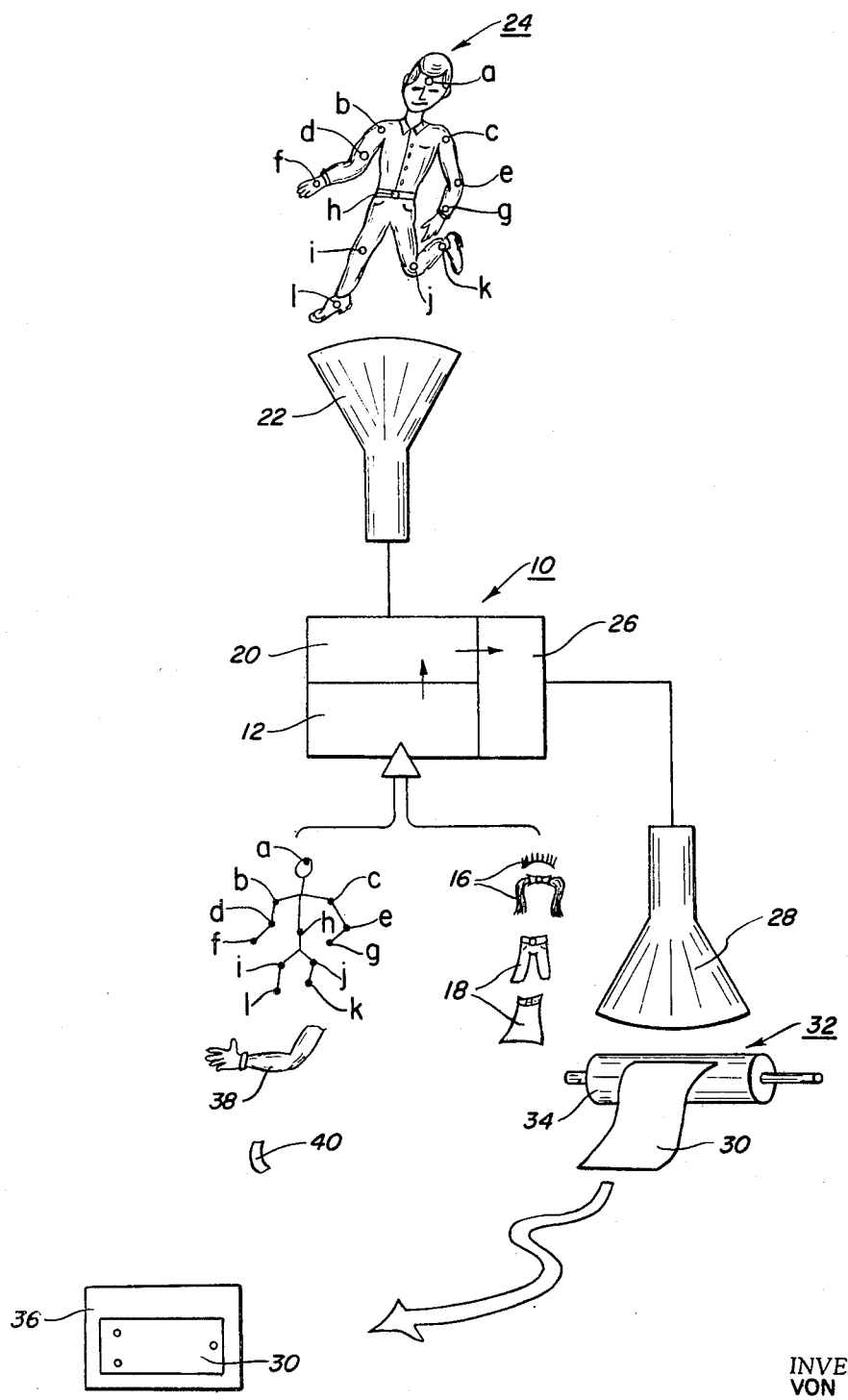
INVENTOR.
VON HANEY
BY Ronald Zibelli
ATTORNEYS United States Patent Office 3,510,210
Patented May 5, 1970

3,510,210
COMPUTER PROCESS CHARACTER ANIMATION
Von Haney, Webster, N.Y., assignor to Xerox Corporation, Rochester, N.Y., a corporation of New York
Filed Dec. 15, 1967, Ser. No. 690,991
Int. Cl. G03b 15/03, 29/00
U.S. Cl. 352—39     5 Claims

ABSTRACT OF THE DISCLOSURE

A method of producing animation by providing a computer with the characteristics of an animated character to be reproduced, interfacing a television camera or the like with a computer, having a live actor perform the necessary movements to relate the desired activities, and printing out the computer output in terms of animated cartoon characters is disclosed.

BACKGROUND OF THE INVENTION

The prior art in this area has long suffered from the need of providing an economical means of production for instructional softwear and for the full utilization of animation techniques as an effective teaching device. A great deal of this difficulty has derived from the fact that the use of animation in instructional film has been largely restricted because of high production costs. This difficulty arises from the fact that large numbers of extremely detailed drawings are required to produce an animated sequence. Further, this large number of drawings requires a high degree of skill from the artist in order to produce effectively realistic movements in a manner so that at the very least the movements of the animated characters will not be so unrealistic as to constitute a distraction from the substantive point and meaning of the animated sequence. The present invention is a major step toward achieving an adequate degree of realism in the animated sequence at an economical cost consistent with the production of animated sequences for instructional purposes as well as the use of such techniques for the production of conventional animated sequences for entertainment purposes.

In the prior art, it is known to utilize the photographic processes of motion pictures to take a motion picture sequence of a live actor going through a sequence of desired movements to provide the artist a realistic guide for the positioning of his carton characters within a given carton frame or cell. While this approach may result in realistic movement of a later produced carton sequence, it leaves to the artist the expensive and time-consuming job of actually drawing out the carton character for each frame of the motion picture.

More recently attempts have been made to produce animated sequences by means of a computer alone. For example see Kenneth C. Knowlton, "A Computer Technique for Producing Animated Movies," AFIPS—Joint Computer Conference—Proceedings, vol. 25, SJCC (spring 1964), pp. 67–87. While an important advance in the field this approach requires expensive and extensive programming of the entire animated sequence and the use of large amounts of precious, and expensive computer storage space much in demand for other purposes.

As can be seen from the above discussion none of the prior art approaches provided the reasonable quality with low or at least economical production costs required for the full realization of the potential uses of animation in instructional film media.

SUMMARY OF THE INVENTION

Accordingly, it is an object of this invention to provide a new and highly effective method of producing animated sequences which overcome the deficiencies of the prior art as described above.

It is a further object of this invention to provide a new and effective technique for use in production of animated films.

Another object of the present invention is to provide a reasonable quality animated sequence with economical production costs.

Other objects and a fuller understanding of the invention may be had by referring to the following description and claims taken in conjunction with the accompanying drawings.

The present invention overcomes the deficiencies of the prior art and achieves its objective by providing a description to a computer of the characteristics of the characters to be reproduced, and interfacing a television camera or similar pickup means with the computer. A live actor may then perform the necessary movements to relate the desired activity to the computer and a computer print-out in terms of a carton character may then be produced to provide the individual cells of the animated sequence.

BRIEF DESCRIPTION OF THE DRAWINGS

In order to facilitate the understanding of this invention reference will now be made to the appended drawing of a preferred embodiment of the present invention. The drawing should not be construed as limiting the invention but is exemplary only.

In the drawing the figure is a diagrammatic representation of the apparatus necessary for carrying out the method of the present invention.

DESCRIPTION OF THE PREFERRED EMBODIMENT

A preferred embodiment of the present invention is shown in the accompanying figure in which 10 represents a computer which has in its storage unit 12 a description of the characteristics of the animated character to be reproduced. For example, stored in digital form within the computer storage 12 will be a series of animated characters of a general form in a wide variety of stances and positions as indicated by 14. The animated character 14 will be provided in electronic terms within the computer storage including plurality of reference points indicated by the letters a through l, for example on the carton character 14. These reference characters (a–l) will be utilized within the further stages of the computer for comparison purposes with the actions and positions of the actor's body. In addition to a plurality of characters in a wide variety of stances and positions such as are conventionally utilized in the production of animated drawings, additional elements such as a variety of hair formats 16 and varieties of dress 18 will be provided to the computer storage with each of these items having a plurality of configurations depending upon the related position of the cartoon character. In addition the computer storage 12 may contain in digital form pattern blockettes such as arm 33 or merely area blockettes 40 corresponding to the position and configuration of elements of animated character to be produced. The entire array of sub-elements (14, 16, 18, 33, 40, etc.) may be stored on a card, tape, or disk storage and fed into the computer's core storage 12 only when it is desired to produce an animated sequence with a format consisting of those specific sub-elements. Obviously a plurality of such formats each representing a different carton character or group of characters may be stored on tape or the like and fed to the computer's core storage as desired. A system for storing pattern blockettes and reproducing them on call at a cathode-ray tube suitable for use in conjunction with the present invention is disclosed by Schwartz, in U.S. Pat. No. 3,305,841.

The computer is interfaced through an interface comparison unit 20 with a vidicon tube or television camera 22 which serves as a pickup for the actions of a live actor 24 who will perform the desired movements to relate the desired activities of the cartoon character for animation purposes. The live actor 24 will wear or have otherwise attached to his body reflective or illuminous elements $a$ through $l$, at various reference points on his body which are indicative of the motions of the actor. As the actor 24 performs the desired movement the information picked up by vidicon television camera 22 will be digitized and fed to the comparison unit 20 of the computer 10 where the desired figure positions from computer storage 12 and postures of the animated character will be selected and fed to computer output 26. The desired dress patterns, hair styles and the like may be brought from computer storage 12 and superimposed on the figure in the computer output unit 26 in response to suitable external commands and/or programs.

From computer output 26 an interface with a cathode-ray tube or the like 28 is made for the purpose of displaying the computer output. The computer output as displayed on cathode-ray tube 28 may be directly transferred to film or may be transferred to a dielectric cell 30 which is exposed and sensitized to receive the pattern from cathode-ray tube 28 by a means of a conventional xerographic transparency maker 32 indicated by the rotatable xerographic drum 34. The image, once transferred to the dielectric cell 30 which is essentially a transparency, may then be moved to other production stations where it may be placed on an overlay board 36 with background art. At this point a film copy may be made of the animation and any additional background information desired. Alternations and modifications desired to make correction or improve artistic quality may be made to the cell produced at this point prior to recording it on a film to produce a conventional animated film. It should be noted that the computer print-out reproduced on cathode-ray tube 28 will be in terms of the cartoon character stored in computer storage 12 and will merely be related in position and movement to the actions of the live actor 24.

The cartoon character 14 stored in computer storage 12 is broken into a series of reference points. The character may be programmed in terms of a unique completed figure and a plurality of such figures provided to the computer storage 12 or may be programmed at various sub-elements or pattern blockettes which make up the character as indicated by arm 38 and pattern blockettes. A plurality of various postures and elements may be combined by the computer 10 in accordance with the movements of the live actor 24 to produce the desired cartoon character. In the alternative regardless of which of the two methods is utilized to form the cartoon character such items as clothes and hair may be altered by the provision of additional elements such as 16 and 18 within the computer storage 12 and their superimposition by programmed commands. For example, the movements of a little boy may be changed to those of a little girl by reprogramming the trousers to a skirt and the short hair to long hair.

The interface between the vidicon television camera 22 and computer 10 is conventional. This interface involves the production of a video or television signal, converting that signal to a digital form, and comparison and analysis of the signal with respect to stored information. The necessary apparatus for performing these functions is now within the capability of the state-of-the art. For example, see: Albert Arking, "Processing of Tiros Cloud Cover Pictures on a Digital Computer," Computer Graphics, Fred Gruenberger ed., Thompson Book Co., 1967, Washington, D.C. and John Schuck, "TV-Analyzing Computer Expands Scope of Microscopic Studies," Research/Development, vol. 17, pp. 28–31, April 1966. Any one of a number of pattern recognition and comparison techniques known in the art may be adapted to produce the desired results with the presently disclosed method. Typical techniques applicable include those disclosed in U.S. Pats. Nos. 3,339,179; 3,289,160; 3,223,971; 3,191,-149–50 and the like. The otherwise difficult problem of pattern recognition in general is simplified in this case by the use of a small, finite number of luminous or reflective points on the actor's body. Further, the body of the actor and the light spot array may be considered symmetrical with respect to a co-ordinate system with axes at the mid-lines of the body. These facts utilized in this approach simplify the problem of comparison with the stored formats. The comparison circuits may be of a conventional type well known in the art. The production of figures of the desired size to produce the desired perspective may be achieved by means of optical zoom technique well known in the art and additional flexibility in zoom, size correction, and format control may be produced internally in accord with techniques described in the American Federation of Information Processing Society paper by Knowlton cited above.

The live actor 24 by wearing a special rig of clothes with reflective elements attached as indicated $a$ through $l$ on live actor 24 or by wearing a wired array somewhat similar to a set of Christmas tree lights on his body provides clearly distinguishable reference points which correspond to the analogous points on the cartoon character. These points may then be compared on a point by point basis with the composite figure within the computer storage.

The computer print-out as has been noted may be directed towards some form of film or by display on a cathode-ray tube followed by transfer to a silver halide film or may utilize the Xerox transparency method prior to going to the film. The latter is the preferred approach since it provides additional flexibility to the system and allows the economies of this method to be combined with the many advantages of the conventional animation process. For example, the cells 30 produced from the cathode-ray tube 28 may be altered by the artist to provide additional information or to make the movements of the actor somewhat more exaggerated than the live actor 24 could achieve or to provide additional items of information in the form of a background overlay which may be combined with the cell 30 produced by the computer. The cells may be stacked in a multi-array to provide many characters on the same frame and the multiple array may be stacked further on background information which may be altered to provide a realistic animation sequence.

The computer 10 may be a general purpose computer specifically programmed to carry out the above-described operation or may be something less than what is commonly thought of as a computer; that is, it may be simply a group of electrical control circuits specifically adapted to provide the above-described operations.

Alternative modes of both the pick-up and print-out system may be utilized within the scope of the invention.

Thus, in operation the method of the present invention is to provide information to a computer which describes in a multiplicity of various postures the cartoon characters to be reproduced and interfacing that stored information with the action of a live actor as presented to the computer through suitable pick-up means. After a comparison and selection of the desired computer stored cartoon configurations a computer print-out is made which is ultimately transferred, with or without modification as desired, to film the produced animated sequences.

The advantage of the present method, of course, is that it combines many of the desired features of conventional animation processes with the economies of a computer created animation sequence and provides the option of achieving any degree of quality desired since the computer produced animation sequence may easily be altered by artists in the conventional manner. Where less quality is desired, the full advantages of the economies produced by computer produced animation may be taken advantage of.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A method of producing computer processed character animation in which a series of drawings illustrating a cartoon character in different attitudes of motion are produced and ultimately photographed to provide the illusion of a motion picture sequence comprising:
   (a) attaching a small finite number of optically distinguishable reference points in a symmetrical array to the body of an actor to provide an indication of the body position of the actor with respect to a background frame of reference, said actor
   (b) acting out the necessary movements for a desired animation sequence,
   (c) generating an analog video signal representative of the changing radiation pattern incident on a television pick-up tube, said changing radiation pattern corresponding to the movements of said actor with said reference points attached,
   (d) interfacing said television pick-up tube with a digital computer by quantizing the analog video signal produced by said television pick-up tube to a signal form suitable for comparison in said digital computer, so as to describe the characteristics and attitudes of a cartoon character to be reproduced by said digital computer,
   (e) storing a multiplicity of characteristics of cartoon characters to be reproduced in the animated sequence in said digital computer, said characteristics representing a plurality of configurations and attitudes for said cartoon characters,
   (f) comparing said quantized video signal representative of the body position of said actor at preselected time intervals with various sets of said stored characteristics of the cartoon characters to be reproduced,
   (g) selecting the most nearly coincident set of the desired characteristics representing the configuration and attitude of the cartoon character to be reproduced as a result of said comparison with the quantized video signal representative of the body position of the actor at a preselected time, and
   (h) sequentially generating a plurality of print-outs from said computer of the configurations of said cartoon character to be produced each having a body position and attitude corresponding to that of the actor at each of the preselected times in the sequence.

2. The method of claim 1 further including modifying the configuration of said cartoon character to be printed out by a modification of the operation of said computer.

3. The method of claim 2 further including recording said print-out on a xerographic drum and reproducing said print-out on a transparent dielectric cartoon cell.

4. The method of claim 3 further including manually modifying the print-out on said cartoon cell to make corrections and add additional features.

5. The method of claim 4 further including superimposing said cartoon cells on suitable background materials and photographing said cartoon cells and backgrounds to produce an animated motion picture sequence.

References Cited

UNITED STATES PATENTS

| | | |
|---|---|---|
| 1,199,980 | 10/1916 | Gilbreth. |
| 2,466,214 | 4/1949 | Deaton _____ 352—87 |
| 2,730,565 | 1/1956 | Owens. |
| 3,085,877 | 4/1963 | Reid. |
| 3,104,147 | 9/1963 | Whittle et al. |
| 3,322,033 | 5/1967 | Silverman. |

JULIA E. COINER, Primary Examiner

U.S. Cl. X.R.

352—50